United States Patent
Groff et al.

(10) Patent No.: US 7,835,506 B2
(45) Date of Patent: Nov. 16, 2010

(54) METHOD AND SYSTEM FOR REAL-TIME NOTIFICATION AND DISPOSITION OF VOICE SERVICES IN A CABLE SERVICES NETWORK

(75) Inventors: Vincent Groff, Dunwoody, GA (US); Steve Calzone, Duluth, GA (US); Bruce Beeco, Buford, GA (US); Varun Dada, Atlanta, GA (US); Elissa Bordner-Babayigit, Dunwoody, GA (US); Constantine Gavrilidis, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 1363 days.

(21) Appl. No.: 11/247,058

(22) Filed: Oct. 11, 2005

(65) Prior Publication Data

US 2006/0085832 A1 Apr. 20, 2006

Related U.S. Application Data

(60) Provisional application No. 60/617,760, filed on Oct. 12, 2004.

(51) Int. Cl.
*H04M 11/00* (2006.01)

(52) U.S. Cl. .............. 379/90.01; 379/102.03; 348/14.04; 725/106

(58) Field of Classification Search ... 379/88.11–88.25, 379/90.01, 102.03; 348/14.01–14.16; 725/106
See application file for complete search history.

(56) References Cited

U.S. PATENT DOCUMENTS

| 5,623,537 | A | * | 4/1997 | Ensor et al. ................. 379/88.2 |
| 5,629,978 | A | * | 5/1997 | Blumhardt et al. .......... 370/271 |
| 5,805,682 | A | | 9/1998 | Voit et al. |
| 6,707,893 | B1 | * | 3/2004 | Basore et al. ............ 379/93.23 |
| 6,882,709 | B1 | | 4/2005 | Sherlock et al. |
| 6,971,120 | B1 | | 11/2005 | Sheekookian |
| 7,277,445 | B2 | | 10/2007 | Bartfield et al. |
| 7,356,137 | B1 | * | 4/2008 | Burg et al. ............. 379/211.01 |
| 2002/0033416 | A1 | | 3/2002 | Gerszberg et al. |
| 2006/0031904 | A1 | | 2/2006 | Groff et al. |

* cited by examiner

*Primary Examiner*—Simon Sing
(74) *Attorney, Agent, or Firm*—Merchant & Gould

(57) ABSTRACT

A method and system are provided for providing real-time notification and disposition of voice services in a cable television services system. A voice services application server enables communications between one or more telecommunications sources and subscriber set-top boxes in the cable television services system. The voice services application server, in communication with a telecommunications network, enables a subscriber to receive real-time notification of incoming telephone calls on a television connected to a set-top box and to issue disposition instructions for managing the incoming telephone calls. The disposition instructions may include answering a call, not answering a call, or forwarding a call to a voicemail system, or forwarding a call to an alternate telephone number.

18 Claims, 4 Drawing Sheets

METHOD AND SYSTEM FOR REAL-TIME NOTIFICATION AND DISPOSITION OF VOICE SERVICES IN A CABLE SERVICES NETWORK

CROSS REFERENCE TO RELATED APPLICATIONS

This application claims the benefit of provisional U.S. patent application No. 60/617,760, filed Oct. 12, 2004, and which is expressly incorporated herein by reference.

BACKGROUND OF THE INVENTION

With the advent of cable services networks, cable subscribers have grown accustomed to receiving a variety of television programming from numerous broadcasting sources. In recent years, technology advances have enabled subscribers to receive an even greater variety of products and services through cable services networks. Modern cable services networks provide traditional video television programming, telephone services, high speed internet access, electronic mail services, video-on-demand, information services, and the like. Through the use of set-top boxes (computing systems), cable services providers can provide interactive television services to subscribers. Such interactive television services allow customers to interact directly with services providers in response to services and product offerings presented to the subscribers through their television sets. For example, in some current cable services networks, subscribers are able to use a set-top box to access a dedicated screen for viewing a call log of missed calls made to a subscriber telephone number.

Unfortunately, current systems do not offer real-time management of telephone calls (e.g., answering calls, forwarding calls, etc.) made to a subscriber telephone number nor are they capable of displaying notifications of incoming calls while a subscriber is viewing television. Because current systems do not offer real-time notification and disposition of telephone calls, a subscriber may miss desired telephone calls. It is with respect to these and other considerations that the present invention has been made.

BRIEF SUMMARY OF THE INVENTION

In accordance with the present invention, the above and other problems are solved by a method and system for providing real-time notification and disposition of voice services in a cable television services system. The method and system enable a subscriber to receive real-time notification of incoming telephone calls on a set-top box and to issue disposition instructions for managing the incoming telephone calls. The disposition instructions may include answering a call, not answering a call, or forwarding a call to an alternate telephone number.

According to one aspect of the invention, a method is provided for the real-time notification and disposition of voice services from a plurality of telecommunications sources in a cable television services system. The method includes receiving a notification of an incoming voice service from one or more of the plurality of telecommunications sources, sending, in real-time, the notification of the incoming voice service to a set-top box in the cable television services system, receiving, in real-time, a disposition instruction for processing the incoming voice service from the set-top box and sending the disposition instruction for processing the incoming voice service to the one or more of the plurality of telecommunications sources.

In sending the notification of the incoming voice service to a set-top box in the cable television services system, the method further includes retrieving subscriber profile data for the set-top box from a database and sending the notification of the incoming voice service to the set-top box based on the subscriber profile data. The method further includes updating a voice services or call log after sending the disposition instruction for processing the incoming voice service to the one or more of the plurality of telecommunications sources, receiving a request to view the call log, and displaying the call log on a display device in communication with the set-top box. The method further includes displaying the notification of the incoming voice service on a display device in communication with the set-top box.

In receiving a disposition instruction for processing the incoming voice service from the set-top box, the method further includes receiving an instruction to forward a telephone call to a predetermined telephone number. In receiving an instruction to forward a telephone call to a predetermined telephone number, the method further includes receiving an instruction to forward the telephone call to a predetermined telephone number associated with a voicemail system. In receiving a disposition instruction for processing the incoming voice service from the set-top box, the method further includes receiving an instruction to answer a telephone call. In sending the notification of the incoming voice service to a set-top box in the cable television services system, the method further includes sending a telephone number associated with an incoming telephone call to a subscriber associated with the set-top box. The method further includes receiving updated subscriber profile data from the set-top box. The updated subscriber profile data includes subscriber preferences for the notification and disposition of incoming voice services from the set-top box.

Various other aspects of the invention may be implemented by a voice services application server in a cable television services system. The voice services application server is in communication with the plurality of telecommunications sources and a cable service set-top box. The voice services application server is operative to receive a notification of an incoming voice service from the one or more of the plurality of telecommunications sources, send, in real-time, the notification of the incoming voice service to the cable services set-top box in the cable television services system, receive, in real-time, a disposition instruction for processing the incoming voice service from the cable services set-top box and send the disposition instruction for processing the incoming voice service to the one or more of the plurality of telecommunications sources.

These and various other features, as well as advantages, which characterize the present invention, will be apparent from a reading of the following detailed description and a review of the associated drawings.

DETAILED DESCRIPTION OF THE INVENTION

Figure 1:
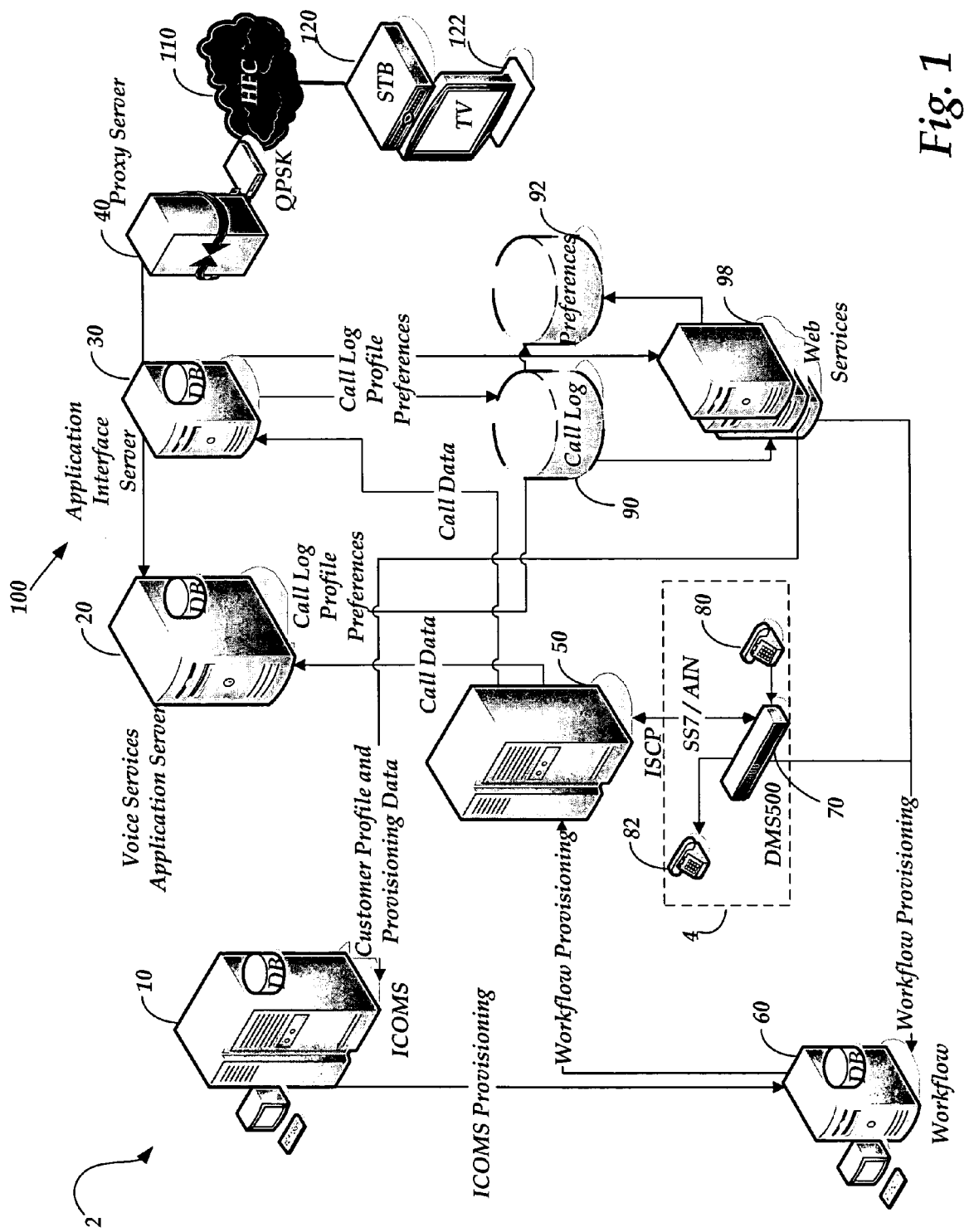
FIG. 1 is a network diagram illustrating a cable services network architecture that serves as an illustrative operating environment for the present invention.

Referring now to the drawings, in which like numerals represent like elements, various embodiments of the present invention will be described. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents. According to an actual embodiment, the present invention is implemented in a cable television/services system in communication with one or more telecommunications sources. FIG. 1 is a block diagram illustrating a cable television/services system architecture 2 (hereinafter referred to as "CATV" system 2) that serves as an illustrative operating environment for the present invention.

Referring now to FIG. 1, digital and analog video programming, information content and interactive television services are provided via a hybrid fiber coax ("HFC") network 110 to a television set 122 for consumption by a cable television/ services system customer. As is known to those skilled in the art, HFC network 110 combines both optical fiber and coaxial cable lines. Typically, optical fiber runs from the cable head end 100 to neighborhoods of 500 to 2,000 customers. Coaxial cable runs from the optical fiber feeders to each customer. According to embodiments of the present invention, the functionality of the HFC network 110 allows for efficient bidirectional data flow between client-side set-top box ("STB") 120 and voice and messaging application server 20 (hereinafter referred to as voice services application server 20) of the present invention.

According to illustrative embodiments of the present invention, the CATV system 2 is in the form of a distributed client-server computing system for providing video and data flow across the HFC network 110 between server-side services providers (e.g., cable television/services providers) via a server-side head end 2 and a client-side customer via client-side STB 120 functionally connected to a customer receiving device, such as the television set 122. As is understood by those skilled in the art, modern CATV systems 2 may provide a variety of services across the HFC network 115 including traditional digital and analog video programming, telephone services, high speed Internet access, video-on-demand, and information services.

The head end 100 of the CATV system 2 is positioned on the server side of the CATV system and includes hardware and software systems responsible for originating and managing content for distribution through the HFC network 110 to client-side STB 120 for presentation to one or more customers via television 122. As discussed above, a number of services may be provided by the CATV system 100, including digital and analog video programming, interactive television services, telephone services, video-on-demand services, targeted advertising, and provision of information content.

In order to provide telephone services, the head end 100 of the CATV system 2 includes an Intelligent Service Control Point ("ISCP") 50. As is known to those skilled in the art, the ISCP 50 acts as an interface with one or more telecommunications sources (such as telecommunications network 4) to enable the deployment of telephone services in the CATV system 2. An illustrative ISCP system which may be utilized by the various embodiments of the invention is the ISCP SYSTEM manufactured by TELCORDIA TECHNOLOGIES, INC. of Piscataway, N.J.

The telecommunications network 4 may include an advanced intelligent network ("AIN") which is currently utilized by the public switched telephone network. As is known to those skilled in the art, the AIN includes various components which use the Signaling System 7 ("SS7") network for signal or system control message transport. The operation of many of the components of the AIN intelligent network is described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

The components of the telecommunications network 4 include a service switching point or switch such as the DMS500 switch 70 which may be utilized for connecting voice channel circuits, including voice channel lines, to telephones 80 and 82 used for initiating and receiving telephone calls. It will be appreciated by those skilled in the art that, according to the various illustrative embodiments of the invention, the switch 70 may also be in communication with a mobile switching center (not shown) for providing wireless communications in the telecommunications network 4.

In operation, the switch 70 may communicate with the ISCP 50 via digital data messages transmitted over a network of digital data links. The switch 70 may be configured to interface with the ISCP 50 through the use of a trigger. A trigger in the network is an event associated with a particular subscriber line or call that causes the switch 70 to generate a data packet message to be sent to the ISCP 50. In the various illustrative embodiments of the invention, the switch 70 activates a termination attempt trigger ("TAT") for each subscriber line authorized for voice services provided by the voice services application server 20.

Referring again to the head end 100 of the CATV system 2, the voice services application server 20 is a general-purpose computing system operative to assemble and manage data sent to and received from the STB 120 via the HFC network 110, for providing voice services on the television 122, including, but not limited to, TV caller ID functionality with real-time call management including call notification and call disposition services (such as call answer and call forwarding) and TV call logs. The head end 100 also includes an Integrated Communications Operations Management System ("ICOMS") which is a general-purpose computing system for integrating customer profile and provisioning data for customer accounts between the voice services application server 20, the ISCP 50, and the switch 70.

The head end 100 also includes a workflow system 60, which is a general-purpose computing system operative to automatically provision network elements for providing voice services in the CATV system 2. Through the workflow system 60, the switch 70 may be provisioned to activate the TAT trigger on each subscriber telephone line authorized to receive television voice services. The ISCP 50 may be provisioned with account information for each provisioned subscriber telephone line including a voicemail number, an address for the voice services application server 20 (the address may be associated with a dialing prefix range such as NPA-NXX), and default subscriber preferences (e.g., whether the subscriber only wishes to be notified of incoming calls or wishes notification and disposition services). Finally, the voice services application server 20 may be provisioned with basic account information for each provisioned subscriber account including an account number, each telephone number associated with an account, the names associated with each telephone number associated with an account, STB IDs associated with each account, an internet protocol ("IP") address for each STB associated with an account (it will be appreciated that the IP address is assigned in real time when the STB boots up), voice services settings and preferences for each account, and call forwarding numbers for each account.

The head end 100 also includes an application interface server 30 in communication with the voice services application server 20, the ISCP 50, and Call Log and Preferences databases 90 and 92. The Call Log database 90 includes data for calls made to a telephone number associated with a subscriber account. The call log data may include the time and date a telephone call to a subscriber was received, the telephone number of the calling party, and the name of the calling party (i.e., Caller ID). The Preferences database 92 includes subscriber preferences for television voice services for a subscriber's account. As discussed above, these preferences may include whether the subscriber wishes to be notified of incoming calls only or wishes notification and disposition services. The application interface server 30 is a general-purpose computing system operative to assemble and manage data sent between the STB 120 and the voice services application server 20. For example, the application server 30 may obtain Caller ID data for an incoming telephone call to a subscriber from the voice services application server 20 and forward the Caller ID data to the television 122 via the HFC network 110 and the STB 120.

The web services system 98 is in communication with the ICOMS 10, the application interface server 30, the Call Log and Preferences databases 90 and 92, and the workflow system 60. In accordance with illustrative embodiments of the invention, the web services system 60 may serve as a collection point for data requested from the ICOMS 10 and the workflow system 60. For example, when the application interface server 30 requires customer profile and provisioning data from the ICOMS 10 or the workflow system 60 for preparation or update of a customer profile, the application interface server 30 passes a data query to the web services system 98. The web services system 98 formulates a data query to each of the available data services systems 10 and 60 for obtaining any available data for a given customer as identified by a STB identification associated with the customer. Thus, the web services system 98 serves as an abstraction layer between the data services systems 10 and 60 and the application interface server 30. That is, the application interface server 30 is not required to communicate with the disparate data services systems 10 and 60, nor is the application interface server 30 required to understand the data structures or data types utilized by the disparate data services systems 10 and 60. The head end 100 in the CATV system 2 also includes a proxy server 40 for intercepting requests from the STB 120 communicated over the HFC network 110.

On the client side of the CATV system 2, digital and analog video programming and digital and analog data (including Caller ID data related to incoming telephone calls) are provided to the television 122 via the STB 120. Interactive television services that allow a customer to input data to the CATV system 2 likewise are provided by the STB 120. As illustrated in FIG. 1, the STB 120 is a multipurpose computing device having a computer processor, memory and an input/output mechanism. The input/output mechanism receives input from server-side processes via the HFC network 110 and from customers via input devices such as a remote control device or a keyboard (not shown). The input devices may communicate with the STB 120 via a suitable communication transport such as an infrared connection. The STB 120 also includes a video processor for processing and providing digital and analog video signaling to the television 122 via a cable communication transport. A multi-channel tuner is provided for processing video and data to and from the STB 120 and the server-side head end system 100, described above.

The STB 120 also includes an operating system for directing the functions of the STB 120 in conjunction with a variety of client applications. In accordance with the illustrative embodiments of the present invention, the STB 120 includes a client application for displaying caller ID data as well as notification and disposition options for managing incoming telephone calls in real-time. The set-top box 120 passes digital and analog video and data signaling to the television 122 via a one-way communication transport. The STB 120 may receive video and data from the server side of the CATV system 2 via the HFC network 110 through a video/data downlink and data via a data downlink. The STB 120 may transmit data from the client side of the CATV system 2 to the server side of the CATV system 2 via the HFC network 110 via one data uplink. The video/data downlink is an "in band" downlink that allows for digital and analog video and data signaling from the server side of the CATV system 2 through the HFC network 110 to the STB 120 for use by the STB 120 and for distribution to the television 122. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink between the HFC network 110 and the STB 120 comprise "out of band" data links. As is understand by those skilled in the art, the "out of band" frequency range generally lies between zero and 54 megahertz. According to illustrative embodiments of the present invention, data flow between the STB 120 and the server-side components of the head end 100 is typically passed through the "out of band" data links. Alternatively, an "in band" data carousel may be positioned in an "in band" channel into which a data feed may be processed from the components of the head end 100 through the HFC network 110 to the STB 120. Operation of data transport between components of the CATV system 2, described with reference to FIG. 1, is well known to those skilled in the art.

Figure 2:
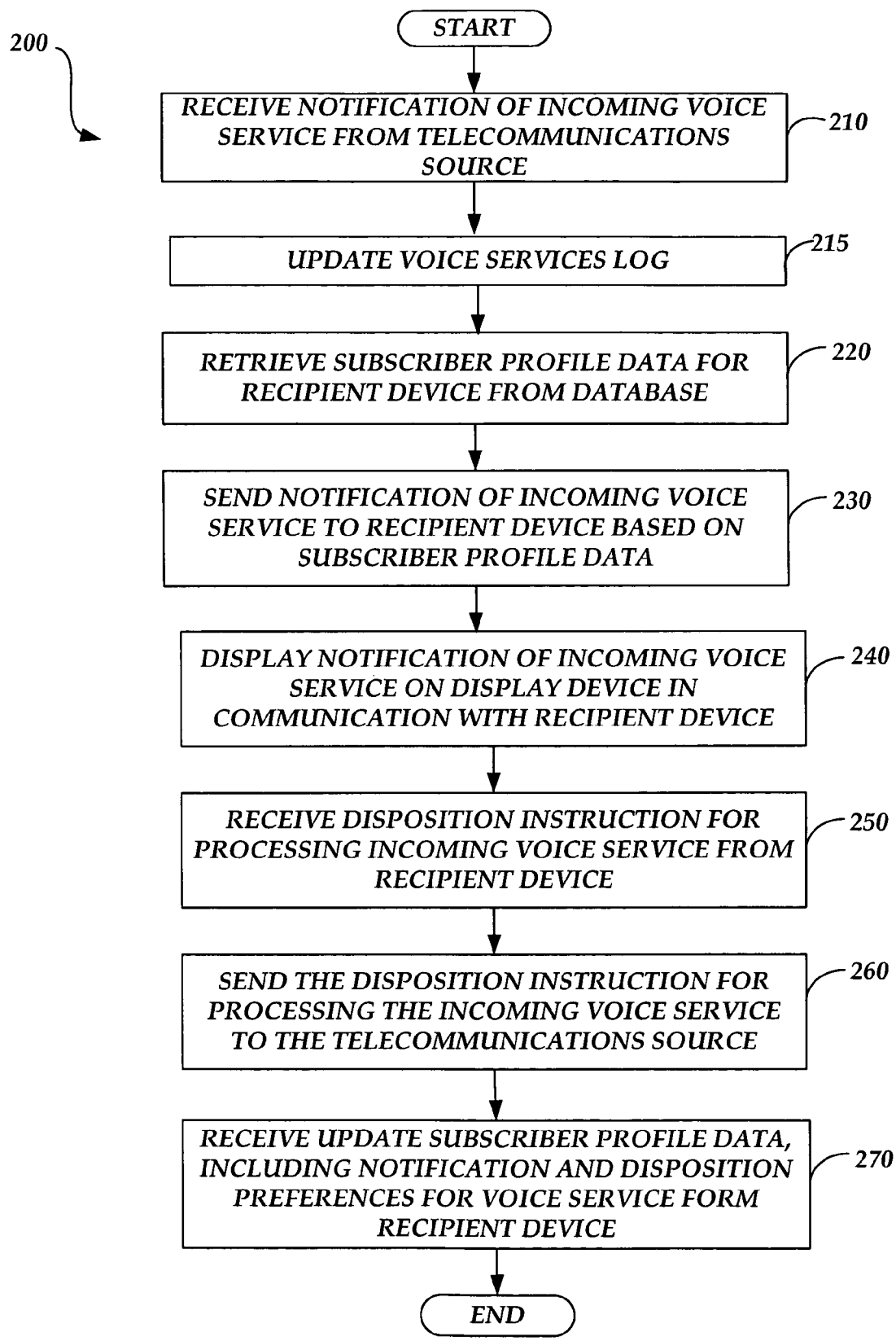
FIG. 2 is a flow diagram showing an illustrative routine for managing, in real-time, the notification and disposition of voice services in a cable services network.

Referring now to FIG. 2, an illustrative routine 200 will be described illustrating a process performed by a server application running on the voice services application server 20 for providing real-time notification and disposition of telephone calls from the telecommunications network 4 in communication with the CATV system 2. It should be appreciated that in accordance with the illustrative embodiments of the invention, the telecommunications network 4 may be a wireline network, a wireless network, or a combination of both wireline and wireless networks.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 2, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIG. 2, the routine 200 begins at operation 210, wherein the voice services application server 20 receives a notification of an incoming voice service (i.e., a telephone call) from a telecommunications source such as the telecommunications network 4 of FIG. 1. In particular, a telephone call from the telephone 80 to a subscriber in the CATV system 2 is routed to the switch 70. The switch 70 then routes the telephone call to the subscriber to the ISCP 50. The ISCP 50 then routes the telephone call, call data (i.e., Caller ID data), and other data associated with the telephone call (such as a subscriber account number) to the voice services application server 20. As discussed above with respect to FIG. 1, each subscriber telephone line authorized for television voice services in the CATV system 2 has a termination attempt trigger (TAT) activated in the switch 70. In response to the TAT, the switch 70 generates a data packet message which is sent to the ISCP 50 utilizing SS7 links in the telecommunications network 4.

The routine 200 then continues from operation 210 at operation 215 where the voice services application server 20 updates a voice services log with the Caller ID data associated with the incoming telephone call. In particular, the voice services application server 20 may update the Call Log database 90 with the time and date of the telephone call, the telephone number, and the name of the calling party (if available). It will be appreciated that in accordance with an illustrative embodiment of the invention, the contents of the Call Log database 90 for each telephone number assigned to a subscriber account may be accessed by the STB 120 via a user interface displayed on the television 122. In this embodiment, the voice services application server 20 receives a request from the STB to retrieve call data from the Call Log database 90 for one or more telephone numbers. The voice services application server 20 then retrieves the requested call data from the Call Log database 90 and sends the requested call data to the STB 120 for display on the television 122.

An illustrative television screen display of a call log interface in accordance with an embodiment of the invention will be described below with respect to FIG. 5. It will be appreciated that the Call Log database 90 may also be updated by the voice services application server 20 as to the status of each incoming telephone call. In particular, all telephone calls received prior to subscriber access to the call log via the STB 120 may be designated as "New" calls.

The routine 200 continues from operation 215 at operation 220 where the voice services application server 20 retrieves subscriber profile data for one or more STBs associated with a subscriber account. In particular, the voice services application server 20 may retrieve the subscriber profile data from the Preferences database 92. The subscriber profile data may include a selection of notification and disposition options to be displayed on a subscriber STB for incoming telephone calls. For example, a subscriber profile may indicate that only a notification banner for displaying missed (i.e., unanswered) calls to a subscriber is to be displayed by a subscriber STB while another subscriber profile may indicate that a disposition banner for displaying incoming telephone calls and options for accepting, forwarding, or sending calls to voice mail is to be displayed by the subscriber STB.

The routine 200 continues from operation 220 at operation 230 where the voice services application server 20 sends a notification of the incoming voice service to the subscriber STB based on the subscriber profile data retrieved at operation 220. In particular, the voice services application server 20 may send call data (i.e., Caller ID data) to the application interface server 30 which may in turn assemble the call data in a data message which is sent to the subscriber STB 120 through the proxy server 40.

The routine 200 continues from operation 230 at operation 240 whereupon receiving the notification from the voice services application server 20, the subscriber STB 120 displays a notification of the incoming voice service on the subscriber television 122. In particular, the STB 120 may generate a call banner (i.e., a notification banner or a disposition banner) within the boundaries of a full screen television program currently being broadcast on the television 122. In accordance with an illustrative embodiment of the invention, the call banner includes a user interface which allows a subscriber to select a notification option (e.g., "remove banner") or a disposition option (e.g., "send to voicemail") for managing telephone calls. Illustrative television screen display of a notification banner and a disposition banner in accordance with an embodiment of the invention will be described below with respect to FIGS. 3 and 4.

The routine 200 continues from operation 240 at operation 250 where the voice services application server 20 receives a disposition instruction for processing an incoming voice service from the subscriber STB 120. As discussed above, the disposition instruction may include accepting a call, forwarding a call to an alternative telephone number, or sending a call to a voicemail system. The routine 200 continues from operation 250 at operation 260 where, upon receiving the disposition instruction from the STP 120, the voice services application server 20 sends the disposition instruction for processing the incoming voice service to the telecommunications source (i.e., the telecommunications network 4). In particular, the disposition instruction may be sent from the voice services application server 20 to the ISCP 50, which in turn, communicates the disposition instruction to the switch 70. The switch 70 then routes the telephone call according to the disposition instruction received from the ISCP 50 (e.g., the telephone call is forwarded to another telephone number).

The routine 200 continues from operation 260 at operation 270 where the voice services application server 20 receives updated subscriber profile data, including notification and disposition preferences for voice services, from the subscriber STB 120. In particular, and in accordance with an illustrative embodiment of the invention, the STB may be configured to generate a preferences screen on the television 122. The preferences screen may include a user interface from which a subscriber may update profile data stored in the Preferences database 92. For example, a subscriber may update a profile to add or edit a list of numbers for forwarding telephone calls. Once the updated subscriber profile data has been received at the voice services application server 20, the profile data is be saved in the Preferences database 92. An illustrative television screen display for editing call forwarding options in accordance with an embodiment of the invention will be described below with respect to FIG. 6. The routine 200 then ends.

Figure 3:
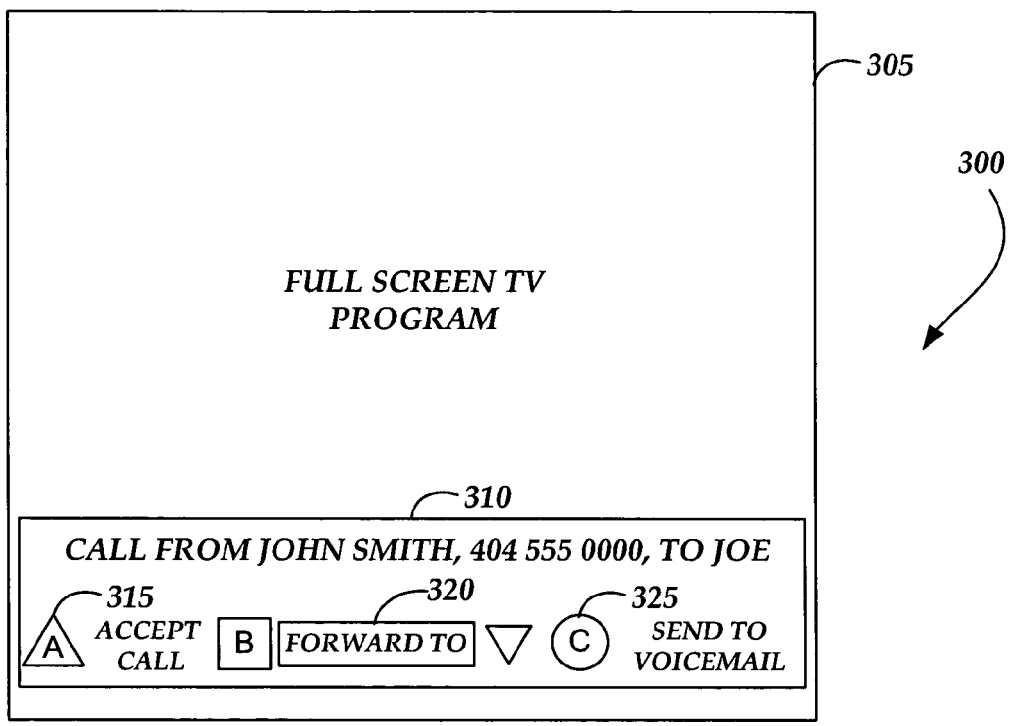
FIG. 3 is a simplified block diagram illustrating a television screen display for disposing of an incoming voice service according illustrative embodiments of the present invention.

FIGS. 3-6 are a simplified block diagram illustrating various television screen displays generated by the STB 120 for managing incoming telephone calls according to illustrative embodiments of the present invention. With respect to each of the FIGS. 3-6, a client application operating on the STB 120 may cause the presentation of a variety of screens that are displayed to a subscriber on the television 122. For example, the television screen display 300 illustrated in FIG. 3 is representative of a screen which is generated upon the STB 120 receiving a notification of an incoming telephone call from the voice services application server 20 as discussed above with respect to FIG. 2. It should be understood that the layout and content of the television screen displays illustrated in FIGS. 3-6 are for purposes of example only and are not limiting of the variety of different layouts and types of content that may be included in such displays according to illustrative embodiments of the present invention.

Referring now to FIG. 3, the television screen display 300 includes a full screen television program 305 which is received from the head end 100 of the CATV system 2 on the STB 120. The disposition banner 310 includes a notification of an incoming telephone call to a subscriber including the name of the calling party, the telephone number of the calling party, and the name of the called party (i.e., the subscriber). The disposition banner 310 also includes selectable icons which the subscriber may select to dispose of an incoming telephone call. In particular, the icon A 320 may be selected to accept an incoming telephone call and the icon C 330 may be selected to send a call to voicemail. The disposition banner 310 also includes a dropdown button 325 from which a user may select from a list of alternate telephone numbers for forwarding the incoming telephone call.

Figure 4:
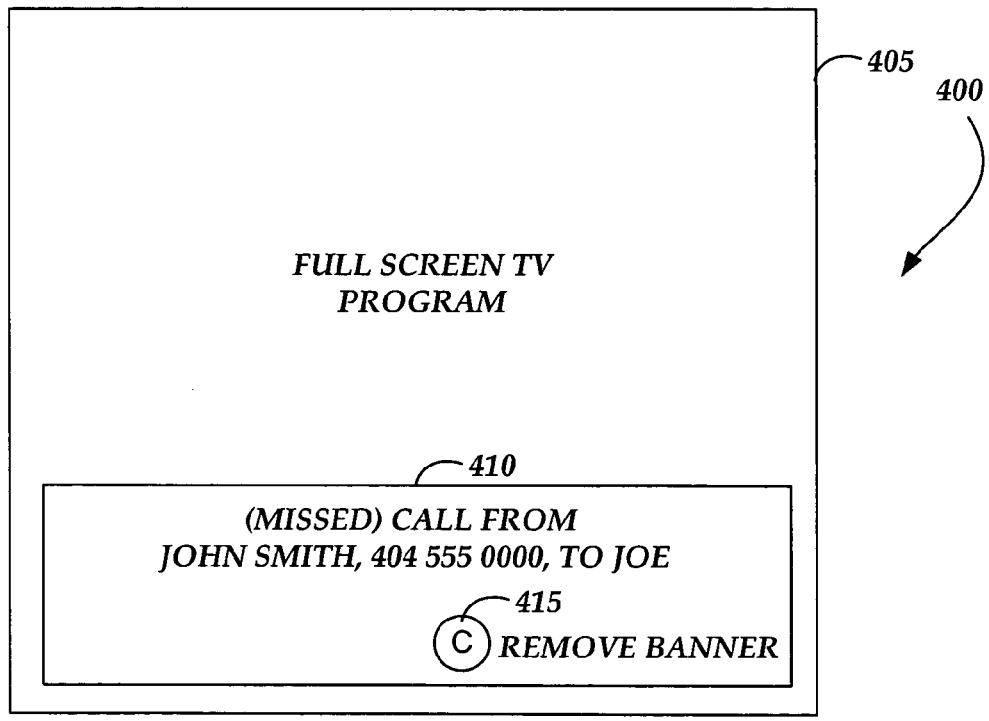
FIG. 4 is a simplified block diagram illustrating a television screen display for notifying a subscriber of incoming voice services according to illustrative embodiments of the present invention.

Referring now to FIG. 4, a television screen display 400 is shown which includes a full screen television program 405 which is received from the head end 100 of the CATV system 2 on the STB 120. The display 400 also includes a notification banner 410 including the name of the calling party, the telephone number of the calling party, and the name of the called party (i.e., the subscriber). The notification banner 410 serves to alert a subscriber of a missed telephone call. The notification banner 415 also includes a selectable icon B 415 which allows a subscriber to remove the banner from the display 400 after the subscriber has viewed the notification.

Figure 5:
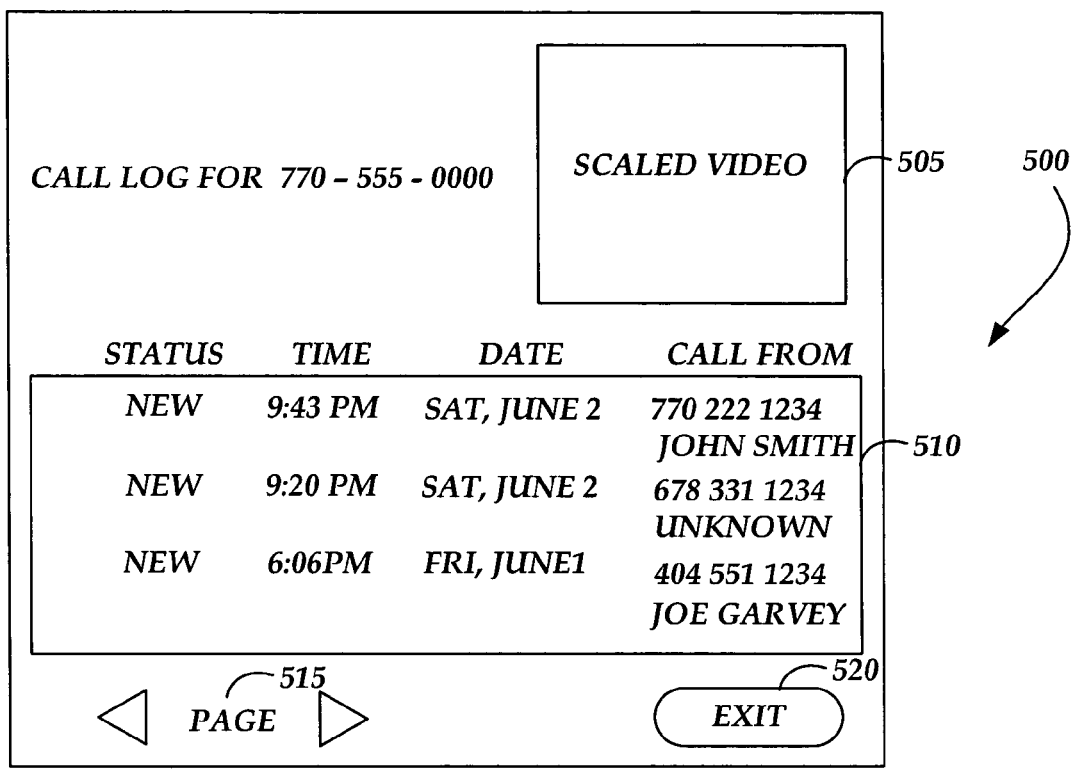
FIG. 5 is a simplified block diagram illustrating a television screen display for displaying a call log of incoming voice services according to illustrative embodiments of the present invention.

Referring now to FIG. 5, a television screen display 500 for displaying a call log listing telephone calls made to a subscriber telephone number is shown. It will be appreciated that the display 500 may be generated by a client application running on the STB 120 in response to a menu selection by a subscriber for viewing the call log. In the display 500, the call log is shown along with a scaled video window 505 for showing a television program (including audio) which is received from the head end 100 of the CATV system 2 on the STB 120. The display 500 also includes a call log window 510 listing information for each call made to a subscriber including the status of each call log entry (i.e., whether a call log entry has been previously viewed by the subscriber), the time and date each call was received, the telephone number of the calling party, and the name of the calling party (if available). The display 500 also includes a "PAGE" user interface 515 which may be used to view additional screens of call log entries when the number of incoming calls exceeds the number of calls that can be displayed on a single screen. Finally, the display 500 also includes an "EXIT" button 520 for exiting the call log screen display 500 (i.e., so that the subscriber may return to viewing a full screen television program).

Figure 6:
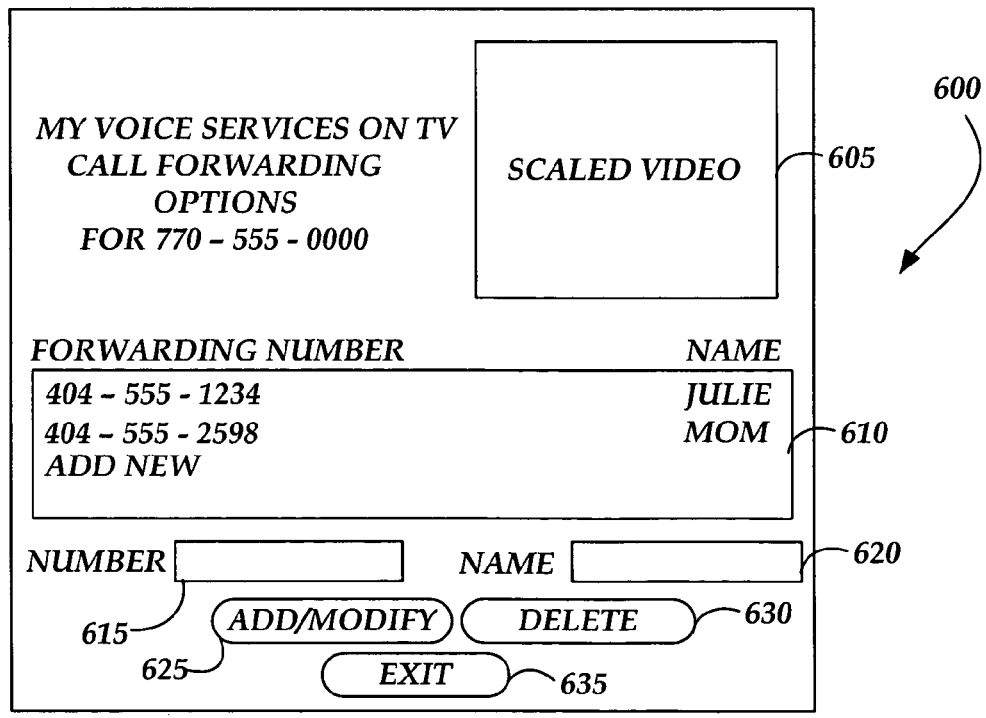
FIG. 6 is a simplified block diagram illustrating a television screen display for managing call forwarding options for incoming voice services according to illustrative embodiments of the present invention.

Referring now to FIG. 6, a television screen display 600 for displaying call forwarding options for adding, deleting, or editing a list of forwarding numbers for incoming calls to a subscriber telephone number is shown. It will be appreciated that the display 600 may be generated by a client application running on the STB 120 in response to a menu selection by a subscriber for managing call forwarding options. In the display 600, a window 610 showing a current list of forwarding numbers and names is shown along with a scaled video window 605 for showing a television program (including audio) which is received from the head end 100 of the CATV system 2 on the STB 120. The display 600 also includes fill-in boxes 615 and 620 for entering new telephone numbers as well as names associated with each number, to the window 610 listing forwarding names and numbers. The display 600 also includes an "ADD/MODIFY" button 625 for adding the name and number information input into the boxes 615 and 620 or to modify existing forwarding information shown in the window 610. The display 600 also includes a "DELETE" button 630 for deleting entries in the window 610. Finally, the display 600 also includes an "EXIT" button 635 for exiting the display 600 (i.e., so that the subscriber may return to viewing a full screen television program).

Based on the foregoing, it should be appreciated that the various embodiments of the invention include a method and system for providing real-time notification and disposition of voice services in a cable television services system. The method and system enable a subscriber to receive real-time notification of incoming telephone calls on a set-top box and to issue disposition instructions for managing the incoming telephone calls. The disposition instructions may include answering a call, not answering a call, or forwarding a call to an alternate telephone number.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for providing real-time notification and disposition of voice services from a plurality of telecommunications sources in a cable television services system, comprising:

receiving, in a cable television services system, a notification of an incoming voice service from one or more of the plurality of telecommunications sources coupled to the cable television services system;

retrieving subscriber profile data for the set-top box from a database maintained in and managed by the cable television services system;

sending the notification of the incoming voice service to a set-top box in the cable television services system based on the subscriber profile data maintained in and managed by the cable television services system;

receiving, at a server in the cable television services system, a disposition instruction for processing the incoming voice service from the set-top box;

analyzing the subscriber profile data by the server to determine a disposition preference according to the disposition instruction received from the set-top box; and sending from the server in the cable television services system the disposition instruction for processing the incoming voice service to the one or more of the plurality of telecommunications sources according to the determined disposition preference, wherein sending the notification of the incoming voice service and receiving the disposition instruction for processing the incoming voice service occur in real-time.

2. The method of claim 1 further comprising updating a voice services log after sending the disposition instruction for processing the incoming voice service to the one or more of the plurality of telecommunications sources.

3. The method of claim 2 further comprising:
receiving a request to view the voice services log; and
displaying the voice services log on a display device in communication with the set-top box.

4. The method of claim 1 further comprising displaying the notification of the incoming voice service on a display device in communication with the set-top box.

5. The method of claim 1, wherein receiving a disposition instruction for processing the incoming voice service from the set-top box comprises receiving an instruction to forward a telephone call to a predetermined telephone number.

6. The method of claim 5, wherein receiving an instruction to forward a telephone call to a predetermined telephone number, comprises receiving an instruction to forward the telephone call to a predetermined telephone number associated with a voicemail system.

7. The method of claim 1, wherein receiving a disposition instruction for processing the incoming voice service from the set-top box comprises receiving an instruction to answer a telephone call.

8. The method of claim 1, wherein sending the notification of the incoming voice service to a set-top box in the cable television services system comprises sending a telephone number associated with an incoming telephone call to a subscriber associated with the set-top box.

9. The method of claim 1 further comprising receiving updated subscriber profile data from the set-top box, the updated subscriber profile data comprising subscriber preferences for the notification and disposition of incoming voice services from the set-top box.

10. In a cable television services system, a system for managing the notification and disposition of voice services from a plurality of telecommunications sources, comprising:
a cable services set-top box disposed at a subscriber premises; and
a voice services application server, disposed in a cable television services system, in communication with the plurality of telecommunications sources and the cable service set-top box at the subscriber premises, wherein the voice services application server is operative to:
receive a notification of an incoming voice service from one or more of the plurality of telecommunications sources;
retrieve subscriber profile data for the cable services set-top box from a profile preferences database maintained in and managed by the cable television services system, the profile preferences database being in communication with the voice services application sever;
send the notification of the incoming voice service to the cable services set-top box in the cable television services system based on the subscriber profile data maintained in and managed by the cable television services system;
receive a disposition instruction for processing the incoming voice service from the cable services set-top box;
analyze the subscriber profile data to determine a disposition preference according to the disposition instruction received from the set-top box; and
send the disposition instruction for processing the incoming voice service to the one or more of the plurality of telecommunications sources according to the determined disposition preference, wherein sending the notification of the incoming voice service and receiving the disposition instruction for processing the incoming voice service occur in real-time.

11. The system of claim 10, wherein the voice services application server is further operative to update a voice services log after sending the disposition instruction for processing the incoming voice service to the one or more of the plurality of telecommunications services.

12. The system of claim 11, wherein the voice services application server is further operative to:
receive a request to view the voice services log; and
display the voice services log on a display device in communication with the cable services set-top box.

13. The system of claim 10, wherein the voice services application server is further operative to display the notification of the incoming voice service on a display device in communication with the cable services set-top box.

14. The system of claim 10, wherein the voice services application server in receiving a disposition instruction for processing the incoming voice service from the cable services set-top box is further operative to receive an instruction to forward a telephone call to a predetermined telephone number.

15. The system of claim 14, wherein the voice services application server in receiving an instruction to forward a telephone call to a predetermined telephone number is further operative to receive an instruction to forward the telephone call to a predetermined telephone number associated with a voicemail system.

16. The system of claim 10, wherein the voice services application server in receiving a disposition instruction for processing the incoming voice service from the cable services set-top box is further operative to receive an instruction to answer a telephone call.

17. The system of claim 10, wherein the voice services application server in sending the notification of the incoming voice service to a cable services set-top box in the cable television services system is further operative to send a telephone number associated with an incoming telephone call to a subscriber associated with the cable services set-top box.

18. The system of claim 10, wherein the voice services application server is further operative to receive updated subscriber profile data from the cable services set-top box, the updated subscriber profile data comprising subscriber preferences for the notification and disposition of incoming voice services from the cable services set-top box.

* * * * *